US010129916B1

(12) United States Patent
Lakshminarayan

(10) Patent No.: US 10,129,916 B1
(45) Date of Patent: Nov. 13, 2018

(54) SYSTEM AND METHOD FOR CONTROLLING NETWORK PARAMETERS FOR A PLURALITY OF HOME SECURITY/HOME SYSTEM CONTROL PANELS

(71) Applicant: Honeywell International Inc., Morris Plains, NJ (US)

(72) Inventor: Nagaraj Chickmagalur Lakshminarayan, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 57 days.

(21) Appl. No.: 15/593,013

(22) Filed: May 11, 2017

(51) Int. Cl.
| | |
|---|---|
| *H04W 76/11* | (2018.01) |
| *G08B 25/00* | (2006.01) |
| *H04W 72/04* | (2009.01) |
| *H04L 29/12* | (2006.01) |
| *H04W 4/04* | (2009.01) |
| *H04W 8/26* | (2009.01) |

(Continued)

(52) U.S. Cl.
CPC ........... *H04W 76/11* (2018.02); *G08B 25/003* (2013.01); *H04L 61/3005* (2013.01); *H04W 72/048* (2013.01); *G08B 25/10* (2013.01); *H04L 61/6081* (2013.01); *H04W 4/043* (2013.01); *H04W 4/80* (2018.02); *H04W 8/26* (2013.01)

(58) Field of Classification Search
CPC ........ H04H 20/57; H04H 20/91; H04H 60/13; H04H 60/91; H04L 12/66; H04L 41/0806; H04L 41/082; H04W 24/02; H04W 84/12

See application file for complete search history.

(56) References Cited

U.S. PATENT DOCUMENTS 6,917,614 B1 * 7/2005 Laubach ............. H04L 12/2801
370/392
8,589,541 B2 * 11/2013 Raleigh ............... H04L 41/0893
709/224

(Continued)

FOREIGN PATENT DOCUMENTS

| | | |
|---|---|---|
| EP | 2320605 A1 | 5/2011 |
| EP | 2543164 A2 | 1/2013 |
| WO | 2017131320 A1 | 8/2017 |

OTHER PUBLICATIONS

European Search Report and Written Opinion dated Jul. 9, 2018.

*Primary Examiner* — Sai Aung
(74) *Attorney, Agent, or Firm* — Wood, Phillips, Katz, Clark & Mortimer

(57) ABSTRACT

A computer processor implemented method (10) is provided to control network parameters for a plurality of networked control panels (12) for wireless security/control systems (14). Each of the networked control panels using wireless signals (26,27) to monitor and control a unique set of monitored electronic devices (16). The method includes the steps of: (a) transmitting an electronic signal (38) from a control panel (12) to a central computer processor (20), the electronic signal (38) providing data indicating a physical location of the control panel (12); and (b) in response to the electronic signal (38), the central processor (20) automatically assigning a Personal Area Network ID and channel number (34) to the control panel that do not conflict with any networked control panel near the physical location of the control panel (12).

20 Claims, 2 Drawing Sheets

(51) Int. Cl.
  *G08B 25/10*    (2006.01)
  *H04W 4/80*     (2018.01)

(56) References Cited

U.S. PATENT DOCUMENTS

| | | |
|---|---|---|
| 8,630,225 B2 * | 1/2014 | Karaoguz ............. H04H 20/57 |
| | | 370/328 |
| 8,942,186 B2 | 1/2015 | Dinulescu et al. |
| 9,306,809 B2 | 4/2016 | Dawes et al. |
| 2006/0140147 A1 * | 6/2006 | Van Bemmel .... H04W 72/1278 |
| | | 370/329 |
| 2017/0013597 A1 | 1/2017 | Beema et al. |
| 2017/0032660 A1 | 2/2017 | El-Mankabady et al. |

\* cited by examiner

SYSTEM AND METHOD FOR CONTROLLING NETWORK PARAMETERS FOR A PLURALITY OF HOME SECURITY/HOME SYSTEM CONTROL PANELS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This invention relates to wireless security/control systems for use in homes, offices, apartments, businesses, and other residential and work-related locations to monitor and/or control wireless electronic devices such as smoke or gas sensors/detectors, thermostats, lights, video cameras, sound systems, and window door sensors, door locks, automated window shades, etc., and more particularly, to systems and methods for allowing a network of such wireless security/control systems to be operated with some of the wireless security/control systems in close proximity (wireless signal range) of each other.

BACKGROUND

Wireless security/control systems for use in homes, offices, apartments, businesses, and other residential and work-related locations are becoming increasingly popular, and with their increasing popularity, the density of individual systems within a given geographic location or area is increasing. This creates issues with respect to potential interference and confusion between the channel assignments of the wireless control signals of each independent wireless security/control system and with the assignment of Personal Area Network Identification Number (PAN ID) numbers to uniquely identify each individual wireless security/control system by a central monitoring/control network. These issues can create supervision failures between the central/network control system and individual wireless security/control systems, as well as Wi-Fi interference between any individual wireless security/control system and other wireless security/control systems both within and outside of the network of the individual wireless security/control system.

SUMMARY

In accordance with one feature of the invention, an computer processor implemented method is provided to control network parameters for a plurality of networked control panels for wireless security/control systems. Each of the networked control panels has a media access control address and uses wireless signals to monitor and control a unique set of monitored electronic devices in a unique wireless security/control system. The method includes the steps of: (a) transmitting an electronic signal from a control panel to a central computer processor, the electronic signal providing data indicating a physical location of the control panel and a media access control address of the control panel; (b) in response to the electronic signal, the central processor assigning a PAN ID and a channel number to the control panel that do not conflict with the PAN ID and channel number of any networked control panel near the physical location of the control panel; (c) transmitting an electronic signal from the central processor to the control panel providing the assigned PAN ID and assigned channel number to the control panel; (d) in response to the electronic signal from the central processor, the control panel configuring a wireless transceiver to operate on the assigned channel number; and (e) repeating steps (a) through (d) for one or more additional control panels.

According to one feature, step (b) further includes the central computer processor accessing a memory containing physical location information, channel numbers and media access control addresses for networked control panels that have already been assigned channel numbers and PAN ID's by the central processor, comparing the physical location of the control panel with the physical location information of the networked control panels, and assigning the channel number based upon the physical location information and channel numbers of other networked control panels within a predetermined physical proximity of the control panel.

As one feature, step (b) further includes the central computer processor automatically updating the memory with the physical location information, the media access control address, the assigned PAN ID, and the assigned channel number for the control panel.

In one feature, step (d) further includes the control panel storing the PAN ID and the channel number in a memory of the control panel.

According to one feature, step (b) further includes the central computer processor automatically assigning a Virtual Area Network Identification Number (VAN ID) to the control panel, the VAN ID being assigned to all networked control panels within a predetermined physical proximity to the control panel.

As one feature, step (c) further includes updating the memory with the VAN ID assigned to the control panel.

In one feature, at least one of the one or more additional control panels is assigned a different VAN ID than the VAN ID assigned to the control panel.

According to one feature, the electronic signal of step (a) further provides parameters of any other control panels detected by the control panel, the parameters for each of the other control panels including at least one of: a, channel number; b, wireless signal strength; and c. PAN ID.

As one feature, the parameters further include a count of wireless signal sources detected by the control panel.

In one feature, the method further includes the step of the central processor automatically updating the memory with the parameters of any other control panels is detected by the control panel in response to the electronic signal of step (a).

According to one feature, step (b) further includes the central processor automatically assigning a channel number that doesn't conflict with any of the other control panels detected by the control panel.

As one feature, the data indicating the physical location of the control panel includes at least one of a street or name of a building in which the control panel is located. In a further feature, the data indicating the physical location of the control panel includes the zip code of the building. According to another feature, the data indicating the physical location of the control panel includes an identifier of an apartment in the building, the apartment having a room in which the control panel is located. As yet another feature, the data indicating the physical location of the control panel includes a floor number indicating a floor of the building, the floor having a room in which the control panel is located.

In one feature, the data indicating the physical location of the control panel includes global positioning system data for the physical location of the control panel.

According to one feature, a non-transitory computer readable storage medium includes instructions for implementing the method in a computer processor executing the instructions.

As one feature, a system is provided for controlling network parameters for a plurality of networked control panels for wireless security/control systems, each networked control panel using wireless signals to monitor and control a unique set of monitored electronic devices in a unique wireless security/control system. The system includes a central computer processor, at least one memory, and a plurality of control panels, all of which are configured to implement the method.

Other features and advantages will become apparent from a review of the entire specification, including the appended claims and drawings.

DETAILED DESCRIPTION

Figure 1:
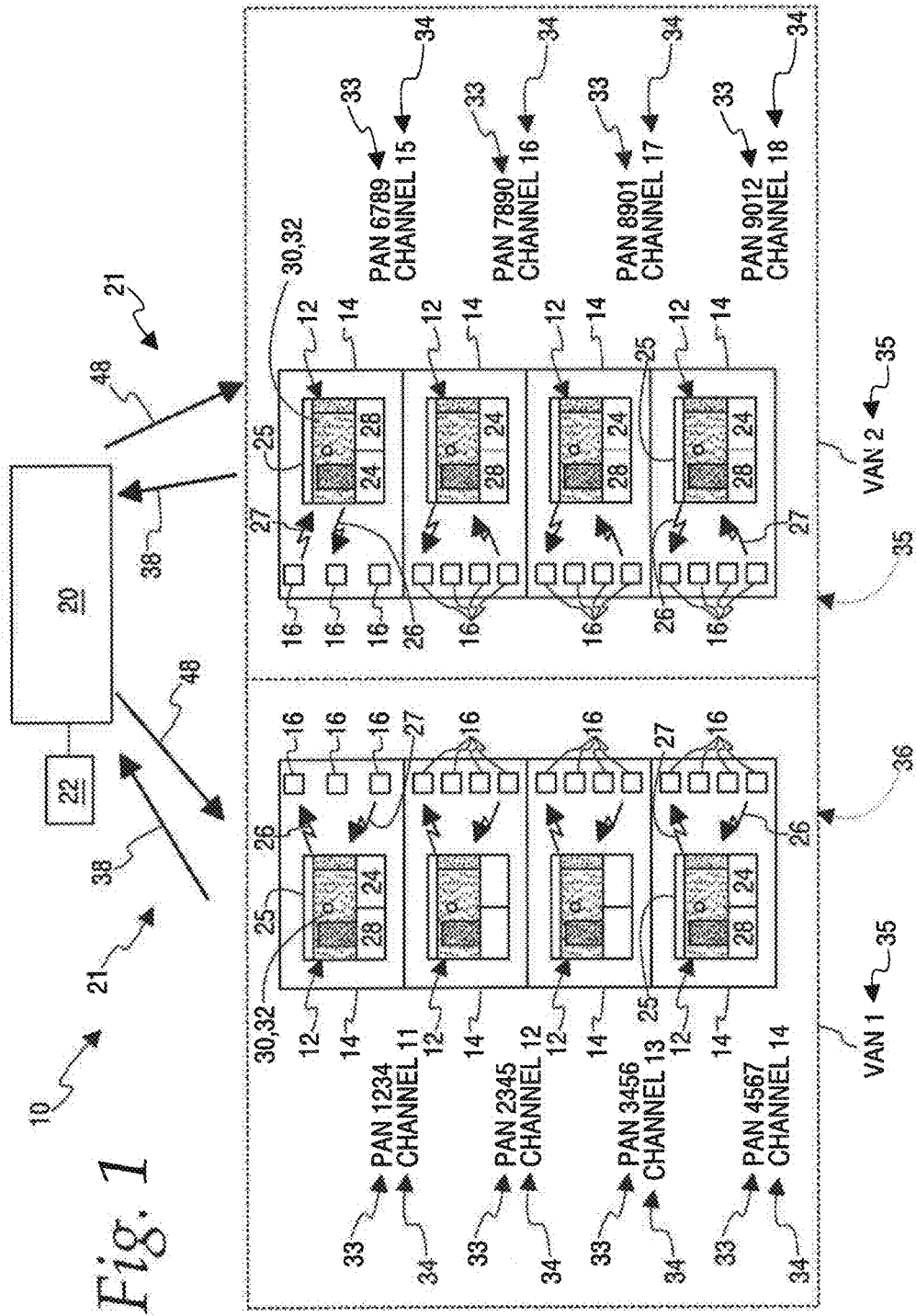
FIG. 1 is a diagrammatic view illustrating a system and method according to this disclosure.
Figure 2:
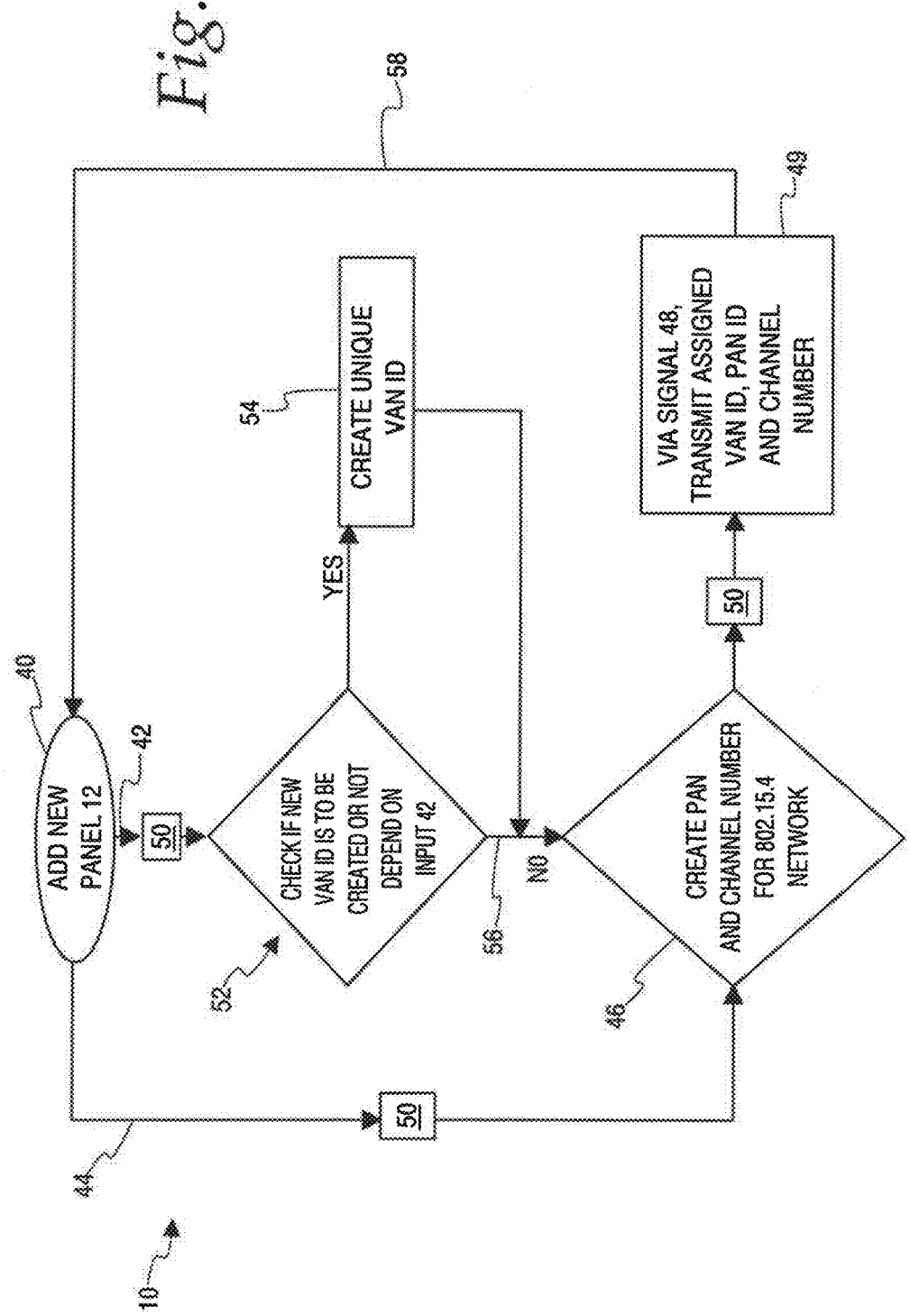
FIG. 2 is a flow chart illustrating the method according to this disclosure.

With reference to FIGS. 1 and 2, a system and method 10 are shown to control network parameters for a plurality of networked control panels 12 of wireless security/control systems 14 for use in homes, offices, apartments, businesses and other residential and work locations. Each networked control panel 12 controls a unique set of monitored electronic devices 16 in a unique wireless security/control system 14. The electronic devices 16 can be any electronic device that can be remotely monitored, controlled or operated by wireless signals from the control panel 12, such as, for example, door locks, microphones, video cameras, door and window sensors, thermostats, lights, automatic window shades and blinds, smoke and gas sensors, etc. The system 10 includes a central computer processor 20 that is operable connected to each of the networked control panels 12 so as to receive and send electronic signals from and to each of the control panels 12. The system and method 10 can provide centralized monitoring of and communications with a plurality of the wireless security/control systems 14 spread throughout a geographical area or location, such as, for example, a village, town, city, county, state, country, or even the entire world, and, in particular, can create network parameters for each networked control panel 12 that will identify each of the networked wireless security/control systems 14 and allow a plurality of the systems 14 to operate successfully even when they are located in close enough proximity to each other to create the potential for interference between their respective wireless signals.

The central computer processor 20 can be of any suitable design and configuration, many of which are known, capable of operating an algorithm based upon a series of commands, and can be included as a part of a desktop computer, a server, or any other similar device. The processor 20 is capable of receiving and sending electronic signals 21 from and to the control panels 12 via a suitable connection, many of which are know, such as for example, a hardwired connection and/or a wireless connection. The central processor 20 can access a memory 22 to retrieve and store network parameters and other information/data relevant to the networked control panels 12 and wireless security control systems 14. The memory 22 can be of any suitable type and configuration or combination of types and configurations, including, a hard drive, flash drive, optical disc drive, RAM, DRAM, SRAM, ROM, PROM, EPROM, EEPROM, etc. It should be understood that as used herein, the term "memory" can include any device, or combination of devices, capable of storing data/information and being automatically accessed by a computer processor that is in communication therewith.

In the illustrated embodiment, each of the control panels 12 includes its own computer processor 24, a wireless transceiver 25 controlled by and connected to the processor 24 for transmitting wireless signals 26 to and receiving wireless signals 27 from the electronic devices 16 that are to be monitored/controlled by the panel 12, a memory 28 for storing the information required for operating and monitoring the electronic devices 16 and for communicating with the central processor, and a user input 30 connected to the processor 24 to allow an operator of the control panel 12 to input commands and information, and a user output 32, for providing information to an operator of the control panel 12. The components 24, 26, 28, 30 and 32 can be of any suitable type and configuration, many of which are known. For example, the user input 30 and the user output 32 can be combined in the form of a touch screen display or can be separated into a keypad and/or microphone for the user input 30 and an LED or LCD screen/display and/or speaker for the user output 32.

The system and method 10 are configured to assign a unique PAN ID 33 and wireless signal channel number 34 to each networked control panel 12 that is in close proximity to other networked control panels 12, particularly if the control panels 12 are near enough to create the potential of interference between their respective wireless signal channels. Each of the networked control panels 12 will have a Media Access Control (MAC) address and will use the assigned wireless signal channel 34 to monitor and control its unique set of monitored electronic devices 16. By assigning a unique channel number 34 for the wireless signals 26,27 to be used by each control panel 12, the wireless signals 26,27 being transmitted between each control panel 12 and its unique set of monitored electronic devices 16 will not interfere with the wireless signals 26,27 being transmitted between a nearby control panel 12 and its unique set of electronic devices 16. Furthermore, in the illustrated embodiment, the system and method 10 is configured to assign a Virtual Area Network Identification Number (VAN ID) 35 to all of the networked control panels 12 that are within a predetermined proximity of each other to form a Virtual Area Network 36, such as, for example, all of the networked control panels 12 that are located on a single floor of a building, all of the networked control panels 12 that are on the same block and street of a single family housing residential area, and/or all of the network control panels 12 that are located within a single apartment building. Furthermore, the system and method 10 can be configured to limit the total number of networked control panels 12 that are assigned a particular VAN ID. Within any particular Virtual Area Network, the processor 20 will assign each control panel 12 a PAN ID 33 and a channel number 34 that is different from any other control panel 12 within the particular Virtual Area Network.

The system and method 10 accomplishes the above tasks by utilizing the physical location information for each of the networked control panels 12 so that the processor 20 can determine the proximity of each of the networked control panel 12 to each other. In this regard, the physical location information can include the address of the physical location for the control panel 12, including any or all of the street address, city, state, country and zip code; can include the name of a building in which the control panel 12 is located; can include the floor of the building in which the control panel is located; and/or can include the apartment number or other identifier of an apartment having a room in which the control panel 12 is located. The physical location information is transmitted from each of the control panels 12 to the central computer processor 20 via an electronic signal 38 using any suitable signal connection, many of which are known. Furthermore, the processor 20 is capable of receiving additional date/information via the signal 38 about other control panels and wireless devices (networked and non-networked) that are within close enough proximity to any one of the networked control panels 12 for there to be potential interference between the wireless signals, and to assign the channel number 34 to the networked control panel 12 so as to reduce or eliminate the possibility of such interference. In this regard, the signal 38 can include parameters for other control panels (inside and outside of the network) and other wireless devices that are detected by the control panel 12, with the parameters including any or all of the following: the channel numbers of any detected wireless signals, the power of the wireless signals, the bandwidth of the wireless signals, the wireless signal strength of any detected channels, the MAC address and/or PAN ID of any detected control panels or devices, and a count of the wireless signal sources detected by the control panel 12.

With reference to FIG. 2, as shown at 40, in the illustrated embodiment the method 10 includes adding a new control panel 12, which step is initiated by the user input 30 of the control panel 12 being operated by an installer or other person who is setting up the wireless security/control system 14 associated with the control panel 12. As shown at 42, in response to the initiation, the electronic signal 38 is transmitted from the control panel 12 to the central processor 20, with the electronic signal 38 providing data indicating the physical location 38 of the control panel 12, as discussed above, and the Media Access Control (MAC) address of the control panel 12. As is typical, the MAC address will be preloaded into the memory 28 of the control panel 12. The data indicating the physical location of the control panel 12 can either be entered by an installer or other person using the user input 30, or, optionally, the control panel 12 can include circuitry for determining the GPS location data for the control panel 12. Additionally, to the extent that it is available, the signal 38 will also provide the additional data/information discussed above about other control panels and wireless devices (networked and non-networked) that are within close enough proximity to the control panel 12 for there to be potential interference between the wireless signals, as shown at 44.

In response to the electronic signal 38, the central processor 20 automatically assigns a PAN ID 33 and a wireless signal channel number 34 to the control panel 12 that do not conflict with the PAN ID 33 and channel number 34 of any networked control panel 12 near the physical location 38 of the control panel 12, as shown at 46, and transmits the assigned PAN ID and channel number to the control panel 12 being added via an electronic signal 48, as shown at 49. To accomplish step 46 in the illustrated embodiment, the processor 20 will access the memory 22 which will contain the physical location information, channel numbers, and MAC addresses for any networked control panels 12 that have already been assigned channel numbers and PAN ID's by the central processor 20, and the processor 20 will then compare the physical location of the control panel 12 with the physical location information of the previously networked control panels 12 and assign/create a unique PAN ID 33 and a unique channel number 34 based upon the physical location information and channel numbers of other networked control panels 12 within a predetermined physical proximity of the control panel 12. Furthermore, to the extent that the additional information shown at 44 has been provided by the control panel 12 indicating that it has detected a wireless signal from another control panel 12 or other wireless device 16 on a particular wireless signal channel, the processor 20 will select the PAN ID 33 and channel number 34 so that there is no conflict with such other panels 12 and/or devices 16. Additionally, the processor 20 will automatically update the memory 22 with the physical location information, the MAC address, any additional information 44, and the assigned PAN ID 33 and channel number 34 for the control panel 12 being added, as shown at blocks 50.

As shown at 52, in the illustrated embodiment, the central processor 20 can automatically assign a VAN ID to the control panel 12 being added, with the VAN ID being assigned to all network control panels 12 within a predetermined physical proximity 34 to the control panel 12, such as, for example, all of the networked control panels 12 that are on the same floor of a building as the control panel 12 being added, all of the networked control panels 12 that are within the same apartment building as the control panel 12 currently being added, or all of the control panels 12 on a given street within a given block of a single family home residential area. As with the assignment of the PAN ID and channel number, the processor 20 determines the appropriate VAN ID to assign by accessing the memory 22 and comparing the physical location information of the control panel 12 being added to the physical location information of existing Virtual Area Networks and networked control panels 12, and assigns the VAN ID that is appropriate for the location of the control panel 12 being added. In this regard, the processor 20 will check the memory 22 to see if the processor 20 has already created a VAN ID for other networked control panels 12 within the predetermined physical proximity of the control panel 12 being added, and will create a new VAN ID if it determines that there has been no VAN ID assigned for control panels within the predetermined physical proximity of the control panel 12, as shown at 54, or will issue an existing VAN ID if one has already been assigned to other networked control panels 12 within the predetermined physical proximity of the control panel 12 being added, as shown at 56. As with the other information/data, the processor 20 will automatically update the memory 22 with the VAN ID of the control panel 12 being added, as shown at 50, and will transmit the VAN ID to the control panel 12 being added via the signal 48.

On receipt of the signal 48 from the central processor 20, the processor 24 of the control panel 12 being added will configure the wireless transceiver 25 of the control panel 12 to operate on the assigned channel number, and will update the memory 28 with the assigned VAN ID, PAN ID, and channel number provided by the central processor 20.

As shown at 58, the system and method 10 will repeat the above-described process for as many control panels 12 as desired.

It should be understood that the wireless signals 26,27 can be of any suitable type according to any suitable wireless protocol, including, for example, Wi-Fi or local area network protocols such as IEEE 802.11 protocols, Bluetooth protocols, Z-wave protocols, ZigBee protocols, IEEE 802.14 protocols, and IEEE 802.15 protocols. In many applications it will be advantageous for the method and system 10 to be applied to systems 14 that utilize IEEE 802.15.4 wireless signal protocols for the operation of low-rate wireless personal area networks, with the Honeywell proprietary SIX™ network protocol being one commercially available example. It should also be understood that as used herein, the network control panels 12 within any particular Virtual Area Network (under a common VAN ID) will be operating under a common wireless protocol, and that in many applications it will be desirable for all of the networked control panels 12 to be operating under a common wireless protocol.

It should be understood that while preferred embodiments have been disclosed herein, the disclosure contemplates variations on those preferred embodiments. For example, in some applications, it may not be necessary or desired for the system and method 10 to determine or assign VAN ID's. By way of further example, in some applications, it may be desirable for the system and method 10 to work exclusively off of GPS location data for each of the control panels 12. By way of further example, in some applications depending upon the particular wireless signal protocol being used, it may not be desirable or necessary for any information to be provided or determined with respect to any control panels or other wireless devices that are outside of the network. As a further example, it may be desirable in some applications to utilize control panels 12 wherein any inputs are provided via a remote user input device rather than a user input that is integral with the control panel 12. As yet another example, while FIG. 2 illustrates a number of the steps as occurring in series, it may be desirable in some applications for some of the steps to be performed by the processor 20 in parallel. For example, the processor 20 may be configured to store the assigned PAN ID 33 and channel number 34 in the memory 22 in parallel with the step 49 of transmitting the assigned PAD ID 33 and channel number 34 to the control panel 12 being added via the electronic signal 48, rather than in the series operation illustrated by the block 50 in FIG. 2. The above examples are not in any way meant to be exhaustive, and it should be understood that no limitation to a specific embodiment is intended unless expressly recited in one of the appended claims.

The invention claimed is:

1. An computer processor implemented method to control network parameters for a plurality of networked control panels for wireless security/control systems, each of the networked control panels having a media access control address and using wireless signals to monitor and control a unique set of monitored electronic devices in a unique wireless security/control system; the method comprising the steps of:
   (a) transmitting an electronic signal from a control panel to a central computer processor, the electronic signal providing data indicating a physical location of the control panel and a media access control address of the control panel;
   (b) in response to the electronic signal, the central processor assigning a Personal Area Network Identification Number (PAN ID) and a channel number to the control panel that do not conflict with the PAN ID and channel number of any networked control panel near the physical location of the control panel;
   (c) transmitting an electronic signal from the central processor to the control panel providing the assigned PAN ID and assigned channel number to the control panel;
   (d) in response to the electronic signal from the central processor, the control panel configuring a wireless transceiver to operate on the assigned channel number; and (e) repeating steps (a) through (d) for one or more additional control panels.

2. The method of claim 1 wherein step (b) further comprises the central computer processor assigning a Virtual Area Network Identification Number (VAN ID) to the control panel, the VAN ID being assigned to all networked control panels within a predetermined physical proximity to the control panel.

3. The method of claim 2 wherein the central computer processor assigns a VAN ID to at least one of the one or more additional control panels that is different than the VAN ID assigned to the control panel.

4. The method of claim 1 wherein step (b) further comprises the central computer processor accessing a memory containing physical location information, channel numbers and media access control addresses for networked control panels that have already been assigned channel numbers and PAN ID's by the central processor, comparing the physical location of the control panel with the physical location information of the networked control panels, and assigning the channel number based upon the physical location information and channel numbers of other networked control panels within a predetermined physical proximity of the control panel.

5. The method of claim 4 wherein step (b) further comprises the central computer processor automatically updating the memory with the physical location information, the media access control address, the assigned PAN ID, and the assigned channel number for the control panel.

6. The method of claim 4 wherein step (d) further comprises the control panel storing the PAN ID and the channel number in a memory of the control panel.

7. The method of claim 4 wherein step (b) further comprises the central computer processor automatically assigning a VAN ID to the control panel, the VAN ID being assigned to all networked control panels within a predetermined physical proximity to the control panel.

8. The method of claim 7 wherein step (b) further comprises updating the memory with the VAN ID assigned to the control panel.

9. The method of claim 7 wherein at least one of the one or more additional control panels is assigned a different VAN ID than the VAN ID assigned to the control panel.

10. The method of claim 1 wherein the electronic signal of step (a) further provides parameters of any other control panels detected by the control panel, the parameters for each of the other control panels including at least one of:
   a. channel number;
   b. wireless signal strength; and
   c. PAN ID.

11. The method of claim 10 wherein the parameters further include a count of wireless signal sources detected by the control panel.

12. The method of claim 10 further comprising the step of the central processor automatically updating the memory with the parameters of any other control panels detected by the control panel in response to the electronic signal of step (a).

13. The method of claim 10 wherein step (b) further comprises the central processor automatically assigning a channel number that doesn't conflict with any of the other control panels detected by the control panel.

14. The method of claim 1 wherein the data indicating the physical location of the control panel includes at least one of a street or name of a building in which the control panel is located.

15. The method of claim 14 wherein the data indicating the physical location of the control panel includes the zip code of the building.

16. The method of claim 14 wherein the data indicating the physical location of the control panel includes an identifier of an apartment in the building, the apartment having a room in which the control panel is located.

17. The method of claim 14 wherein the data indicating the physical location of the control panel includes a floor number indicating a floor of the building, the floor having a room in which the control panel is located.

18. The method of claim 14 wherein the data indicating the physical location of the control panel includes global positioning system data for the physical location of the control panel.

19. A non-transitory computer readable storage medium comprising instructions for implementing the method of claim 1 in a computer processor executing the instructions.

20. A system for controlling network parameters for a plurality of networked control panels for wireless security/control systems, each networked control panel using wireless signals to monitor and control a unique set of monitored electronic devices in a unique wireless security/control system, the system comprising a central computer processor, at least one memory, and a plurality of control panels, configured to implement the method of claim 1.

* * * * *